United States Patent
Hasty, Jr.

(10) Patent No.: US 7,200,149 B1
(45) Date of Patent: Apr. 3, 2007

(54) SYSTEM AND METHOD FOR IDENTIFYING POTENTIAL HIDDEN NODE PROBLEMS IN MULTI-HOP WIRELESS AD-HOC NETWORKS FOR THE PURPOSE OF AVOIDING SUCH POTENTIALLY PROBLEM NODES IN ROUTE SELECTION

(75) Inventor: William V. Hasty, Jr., Lake Mary, FL (US)

(73) Assignee: MeshNetworks, Inc., Maitland, FL (US)

( * ) Notice: Subject to any disclaimer, the term of this patent is extended or adjusted under 35 U.S.C. 154(b) by 0 days.

(21) Appl. No.: 10/298,542

(22) Filed: Nov. 19, 2002

Related U.S. Application Data

(60) Provisional application No. 60/371,718, filed on Apr. 12, 2002.

(51) Int. Cl.
*H04L 12/28* (2006.01)
*H04H 1/00* (2006.01)

(52) U.S. Cl. ............ 370/400; 370/255; 370/312; 370/338; 455/445

(58) Field of Classification Search ........... 370/238, 370/252, 254, 255, 310, 312, 338, 400; 455/7, 455/445
See application file for complete search history.

(56) References Cited

U.S. PATENT DOCUMENTS

| | | | |
|---|---|---|---|
| 4,494,192 A | 1/1985 | Lew et al. | 710/112 |
| 4,617,656 A | 10/1986 | Kobayashi et al. | 370/445 |
| 4,736,371 A | 4/1988 | Tejima et al. | 370/236 |
| 4,742,357 A | 5/1988 | Rackley | 342/457 |
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |

(Continued)

FOREIGN PATENT DOCUMENTS

CA 2132180 3/1996

(Continued)

OTHER PUBLICATIONS

Wong et al., "Soft Handoffs in CDMA Mobile Systems", Dec. 1997, IEEE Personal Communications.
Wong et al., "A Pattern Recognition System for Handoff Algorithms", Jul. 2000, IEEE Journal on Selected Areas in Communications, vol. 18, No. 7.
Andras G. Valko, "Cellular IP: A New Approach to Internet Host Mobility", Jan. 1999, ACM Computer Communication Review.

(Continued)

*Primary Examiner*—Doris H. To
*Assistant Examiner*—Saba Tsegaye
(74) *Attorney, Agent, or Firm*—Randi L. Karpinia; Joseph J. Buczynski

(57) ABSTRACT

A system and method for identifying potential hidden node problems in a multi-hop wireless ad-hoc communication network, such as an 802.11 network. The system and method evaluates the relationship between the neighbors of each respective node to identify nodes of a wireless ad-hoc communication network whose capabilities of receiving data packets can be adversely affected by hidden node problems in order to avoid selecting paths containing those potentially problem nodes for routing data packets. Specifically, for each node, the system and method generates a node metric identifying the relationship between the neighbors of a node. Each node can then transmit its respective metric with its routing advertisement data, so that other nodes can assess the degree of potential hidden node problem that may be experienced by that node, and can choose to avoid using that potentially problem node for routing data packets to other nodes.

20 Claims, 3 Drawing Sheets

U.S. PATENT DOCUMENTS

| | | | |
|---|---|---|---|
| 5,231,634 A | 7/1993 | Giles et al. | 370/348 |
| 5,233,604 A | 8/1993 | Ahmadi et al. | 370/238 |
| 5,241,542 A | 8/1993 | Natarajan et al. | 370/311 |
| 5,317,566 A | 5/1994 | Joshi | 370/238 |
| 5,392,450 A | 2/1995 | Nossen | 455/12.1 |
| 5,412,654 A | 5/1995 | Perkins | 370/312 |
| 5,424,747 A | 6/1995 | Chazelas | 342/70 |
| 5,502,722 A | 3/1996 | Fulghum | 370/343 |
| 5,517,491 A | 5/1996 | Nanni et al. | 370/352 |
| 5,555,425 A | 9/1996 | Zeller et al. | 710/110 |
| 5,555,540 A | 9/1996 | Radke | 370/462 |
| 5,572,528 A | 11/1996 | Shuen | 370/402 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/346 |
| 5,623,495 A | 4/1997 | Eng et al. | 370/397 |
| 5,627,976 A | 5/1997 | McFarland et al. | 710/309 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,661,727 A | 8/1997 | Kermani et al. | 370/445 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 709/228 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 710/313 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 710/117 |
| 5,857,084 A | 1/1999 | Klein | 710/305 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,118,788 A | 9/2000 | Kermani et al. | 370/461 |
| 6,122,690 A | 9/2000 | Nannetti et al. | 710/102 |
| 6,130,881 A | 10/2000 | Stiller et al. | 370/238 |
| 6,130,892 A | 10/2000 | Short et al. | 370/401 |
| 6,132,306 A | 10/2000 | Trompower | 453/11.1 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,396,814 B1 | 5/2002 | Iwamura et al. | 370/256 |
| 2001/0053699 A1 | 12/2001 | McCrady et al. | 455/513 |
| 2002/0067736 A1* | 6/2002 | Garcia-Luna-Aceves et al. | 370/442 |
| 2002/0122410 A1* | 9/2002 | Kulikov et al. | 370/349 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Ling-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throuput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR IDENTIFYING POTENTIAL HIDDEN NODE PROBLEMS IN MULTI-HOP WIRELESS AD-HOC NETWORKS FOR THE PURPOSE OF AVOIDING SUCH POTENTIALLY PROBLEM NODES IN ROUTE SELECTION

This application claims benefit under 35 U.S.C. §119(e) from U.S. provisional patent application Ser. No. 60/371,718 entitled "A System And Method For Identifying Potential Hidden Node Problems in Multi-Hop Wireless Ad-Hoc Networks For The Purpose Of Avoiding Such Potentially Problem Nodes In Route Selection", filed Apr. 12, 2002, the entire contents of which is incorporated herein by reference.

BACKGROUND OF THE INVENTION

1. Field of the Invention

The present invention relates to a system and method for identifying potential hidden node problems in a multi-hop wireless ad-hoc communication network, such as an 802.11 network. More particularly, the present invention relates to a system and method for identifying nodes of a wireless ad-hoc communication network whose capabilities of receiving data packets can be adversely affected by hidden node problems, in order to avoid selecting paths containing those potentially problem nodes for routing data packets.

2. Description of the Related Art

In recent years, a type of mobile communications network known as an "ad-hoc" network has been developed. In this type of network, each user terminal (hereinafter "mobile node") is capable of operating as a base station or router for the other mobile nodes, thus eliminating the need for a fixed infrastructure of base stations. Accordingly, data packets being sent from a source mobile node to a destination mobile node are typically routed through a number of intermediate mobile nodes before reaching the destination mobile node.

More sophisticated ad-hoc networks are also being developed which, in addition to enabling mobile nodes to communicate with each other as in a conventional ad-hoc network, further enable the mobile nodes to access a fixed network and thus communicate with other types of user terminals, such as those on the public switched telephone network (PSTN) and on other networks such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel," filed on Mar. 22, 2001, now U.S. Pat. No. 6,807,165, and in U.S. patent application Ser. No. 09/815,164 entitled "Prioritized-Routing for an Ad-Hoc, Peer-to-Peer, Mobile Radio Access System", filed on Mar. 22, 2001, now U.S. Pat. No. 6,873,839 the entire content of each of said patent applications being incorporated herein by reference.

As can be appreciated by one skilled in the art, when a node sends packetized data to a destination node, the node typically checks its routing table to determine whether the destination node is contained in its routing table. If the destination node is contained in the node's routing table, the data is transmitted via a path that leads to the destination node. If the destination node is not listed in the node's routing table, then the packet is sent to one or more other nodes listed in the node's routing table, and those other nodes determine if the destination table is listed in their routing tables. The process continues until the data packet eventually reaches the destination node.

As can further be appreciated by one skilled in the art, the "hidden node" problem is a classic problem for Medium Access Protocols (MACs) in these types of ad-hoc networks. The problem occurs when two radios (nodes) are transmitting outside the effective communication range of each other, but both are within the effective communication range of an intermediate node that is also participating in the network. If both of the two radios in the network attempt to communicate with the intermediate node at or near the same time, their signals can collide and/or cause packet corruption at the intermediate node which is the intended receiver. In this case, the two extremal nodes are "hidden" from each other.

The hidden node problem therefore reduces successful packet delivery at the intermediate node. Also, the more hidden nodes there are around the intermediate node, the more severe the packet corruption can be.

Accordingly, a need exists for a system and method for effectively and efficiently identifying nodes experiencing hidden node problems in a wireless ad-hoc communication network, so that routing through those nodes can be avoided if possible.

SUMMARY OF THE INVENTION

An object of the present invention is to provide a system and method for effectively and efficiently identifying nodes experiencing hidden node problems in a wireless ad-hoc communication network.

Another object of the present invention is to provide a system and method for locating and evaluating multiple neighbor node sets for each node, and calculating a degree of hidden nodes present at each node.

Still another object of the present invention is to provide a system and method for communicating a degree of hidden nodes present at each node as a routing advertisement for use in transmission route selection.

Still another object of the present invention is to provide a system and method for calculating at least one transmission route through a network avoiding nodes which advertise a high degree of hidden nodes present.

These and other objects of the present invention are substantially achieved by providing a system and method for identifying potential hidden node problems in a multi-hop wireless ad-hoc communication network, such as an 802.11 network. The system and method evaluates the relationship between the neighbors of each respective node to identify nodes of a wireless ad-hoc communication network whose capabilities of receiving data packets can be adversely affected by hidden node problems, in order to avoid selecting paths containing those potentially problem nodes for routing data packets.

Specifically, for each node, the system and method generates a node metric identifying the relationship between the neighbors of a node. A first neighbor node set is calculated for a node of interest, and thereafter, a neighbor node set is then calculated for each node included in the first neighbor node set. Nodes present in the first neighbor node set, but not present in each subsequent neighbor node sets, respectively, are included in a set of potentially hidden nodes about the node of interest. This value can be communicated with other nodes as a metric in a routing advertisement, so that other nodes can assess the degree of potential hidden node problems that may be experienced by that node, and can choose to avoid using that potentially problem node for routing data packets to other nodes.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
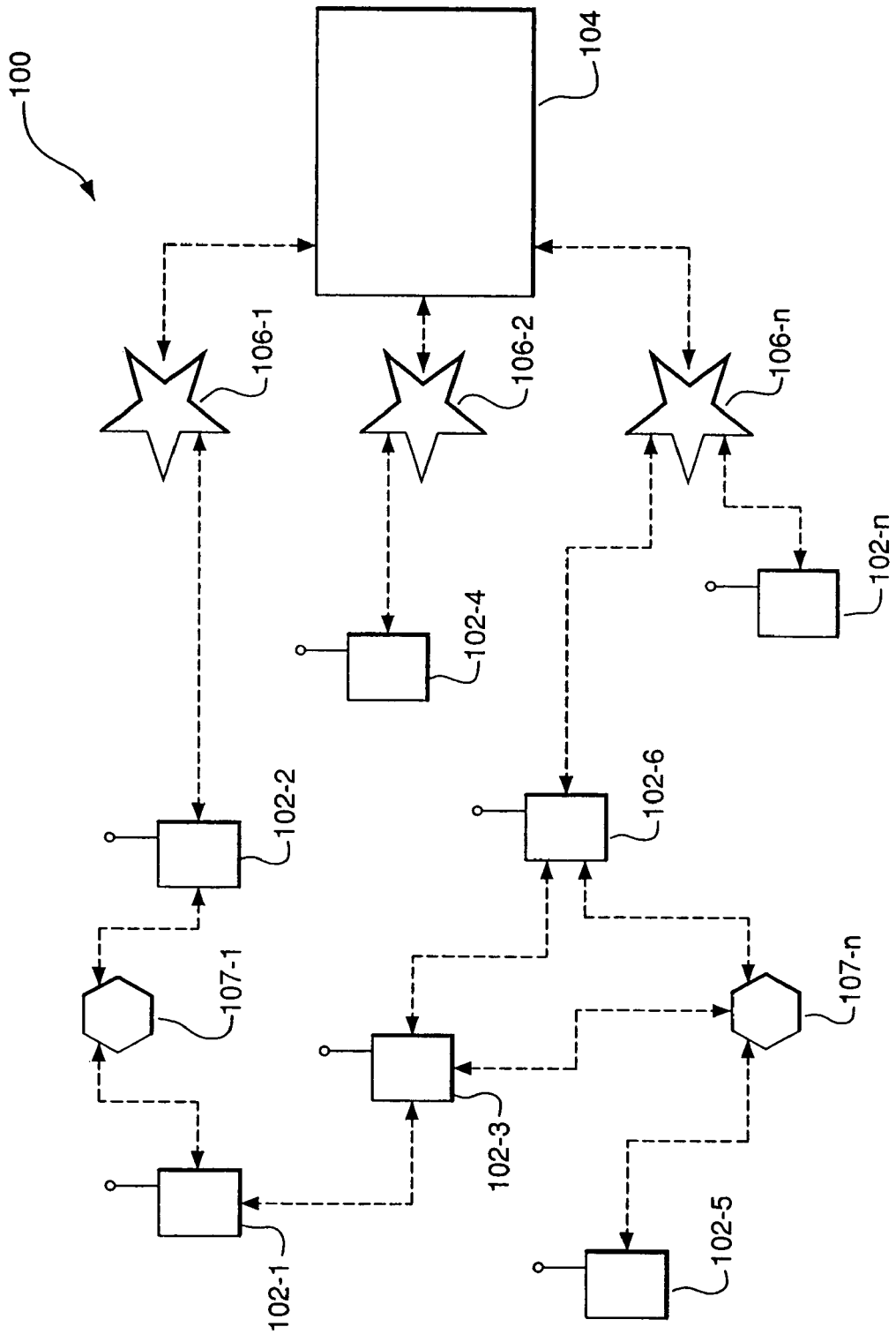
FIG. 1 is a conceptual block diagram of an example of an ad-hoc wireless communications network employing a system and method for identifying the degree of hidden node problems that may be experienced by the respective nodes in the network according to an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes or mobile nodes 102), and a fixed network 104 having a plurality of access points 106-1, 106-2, . . . 106-n (referred to generally as nodes or access points 106), for providing the nodes 102 with access to the fixed network 104. The fixed network 104 includes, for example, a core local access network (LAN), and a plurality of servers and gateway routers, to thus provide the nodes 102 with access to other networks, such as other ad-hoc networks, the public switched telephone network (PSTN) and the Internet. The network 100 further includes a plurality of fixed routers 107-1 through 107-n (referred to generally as nodes or fixed routers 107) for routing data packets between other nodes 102, 106 or 107.

Figure 2:
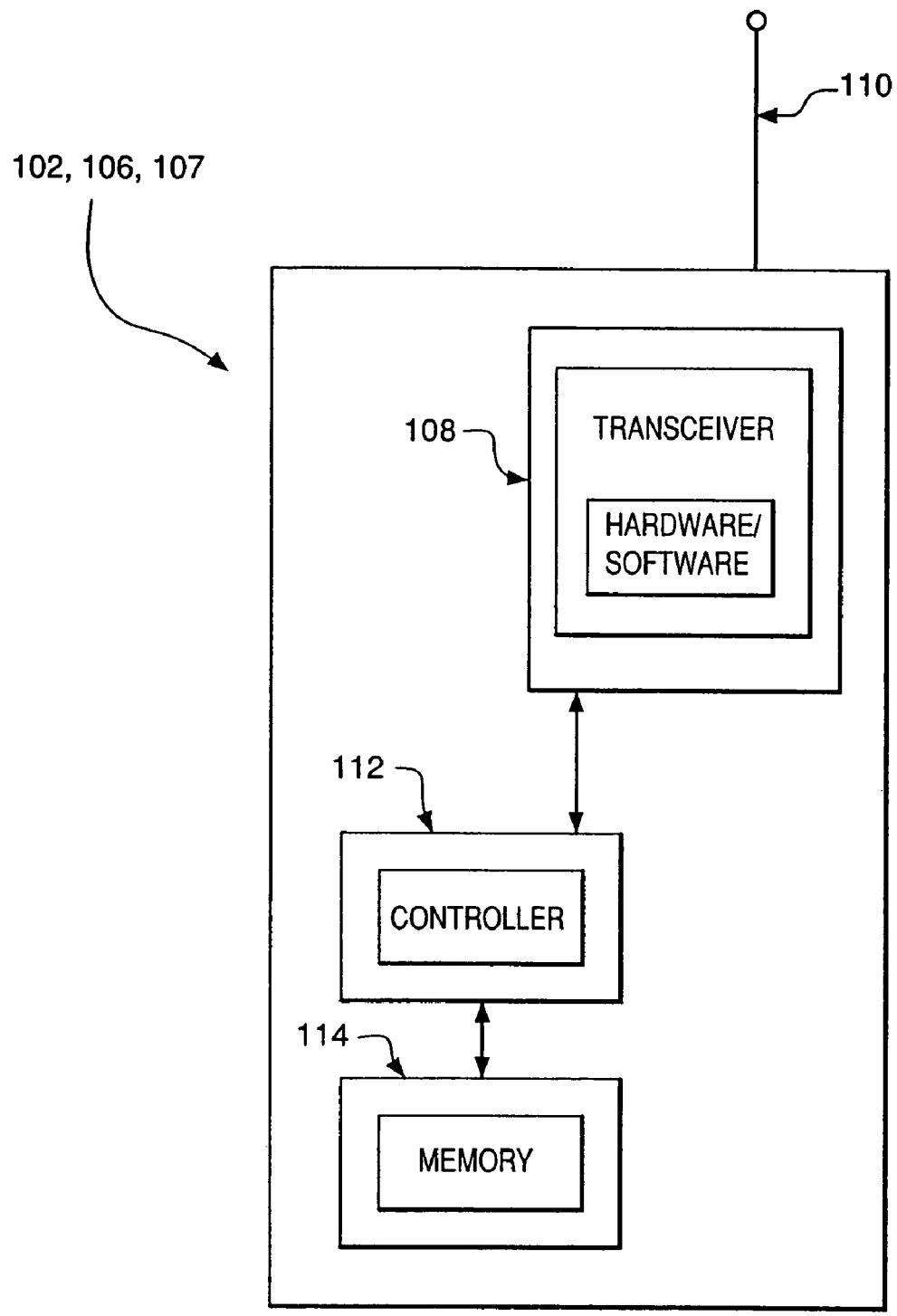
FIG. 2 is a block diagram illustrating an example of components of a node employed in the network shown in FIG. 1.

As can be appreciated by one skilled in the art, the nodes 102,106 and 107 are capable of communicating with each other directly, or via one or more other nodes 102, 106 or 107 operating as a router or routers for data packets being sent between nodes 102, as described in U.S. Pat. No. 5,943,322 to Mayor, which is incorporated herein by reference, and in U.S. patent application Ser. Nos. 09/897,790, 09/815,157, now U.S. Pat. No. 6,807,165; and Ser. No. 09/815,164, now U.S. Pat. No. 6,873,839: referenced above. Specifically, as shown in FIG. 2, each node 102, 106 and 107 includes a transceiver 108 which is coupled to an antenna 110 and is capable of receiving and transmitting signals, such as packetized data signals, to and from the node 102, 106 or 107, under the control of a controller 112. The packetized data signals can include, for example, voice, data or multimedia.

Each node 102, 106 and 107 further includes a memory 114, such as a random access memory (RAM), that is capable of storing, among other things, routing information pertaining to itself and other nodes 102, 106 or 107 in the network 100. In addition, certain nodes, especially nodes 102, can include a subscriber device host (not shown), which can consist of any number of devices, such as a notebook computer terminal, mobile telephone unit, mobile data unit, personal computer (PC), personal data assistant (PDA), or any other suitable device.

In addition to, voice, data and multimedia packetized data signals, the nodes 102, 106 and 107 exchange respective routing information, referred to as routing advertisements or routing table information, with each other via a broadcasting mechanism periodically, for example, when a new node 102 enters the network 100, or when existing nodes 102 in the network 100 move. A node 102, 106 or 107 will broadcast it's routing table updates, and nearby nodes 102, 106 or 107 will only receive the broadcast routing table updates if within broadcast range (e.g., radio frequency (RF) range) of the broadcasting node 102, 106 or 107. For example, assuming that nodes 102-1 and 102-6 are within the RF broadcast range of node 102-3, when node 102-3 broadcasts routing table information, the current table information is received and filed by both nodes 102-1 and 102-6. However, if nodes 102-2, 102-4 and 102-5 are beyond the broadcast range of node 102-3, these nodes will not receive the current table information broadcast.

Each node 102, 106 or 107 in the network 100 can also experience the hidden node problem as discussed in the Background section above. As will now be discussed with regard to FIG. 3, an embodiment of the present invention provides a technique for identifying the degree of the potential hidden node problem that can be experienced by a node 102, 106 or 107, such that other nodes 102, 106 and 107 can avoid including such nodes in selected routing paths for routing data packets through the network 100.

According to an embodiment of the present invention, the wireless ad-hoc network 100 may use certain metrics to avoid degenerate areas of the network demonstrating decreased performance. Optimally, a multi-hop ad-hoc routing network 100 can be configured so that a routing path chosen from a source node to a destination node will ensure the highest bandwidth, lowest latency, and greatest probability for packet delivery. The embodiment of the present invention enables the nodes of network 100 to establish a routing metric, which prevents the nodes from routing packets through areas of the network 100 that contain high degrees of hidden nodes. For this embodiment, the descriptive term "degree of hidden nodes" at a node of interest refers to the number of hidden nodes present about the node.

As discussed above, in a multi-hop wireless ad-hoc routing network 100, a routing advertisement transmitted by a node 102, 106 and 107 may advertise all of the other nodes 102, 106 and 107, or neighbor nodes, with which that node can directly communicate. In addition, the routing advertisement transmitted by a node 102, 106 and 107 typically advertises all of the destinations that can be reached from the node directly, and destinations that can be reached indirectly, listing the intermediate nodes to which the packet must be delivered to in order to reach the destination. As will now be described, an embodiment of the present invention examines the neighbor node routing advertisements transmitted by a node to evaluate the potential hidden problem experienced by that node.

Figure 3:
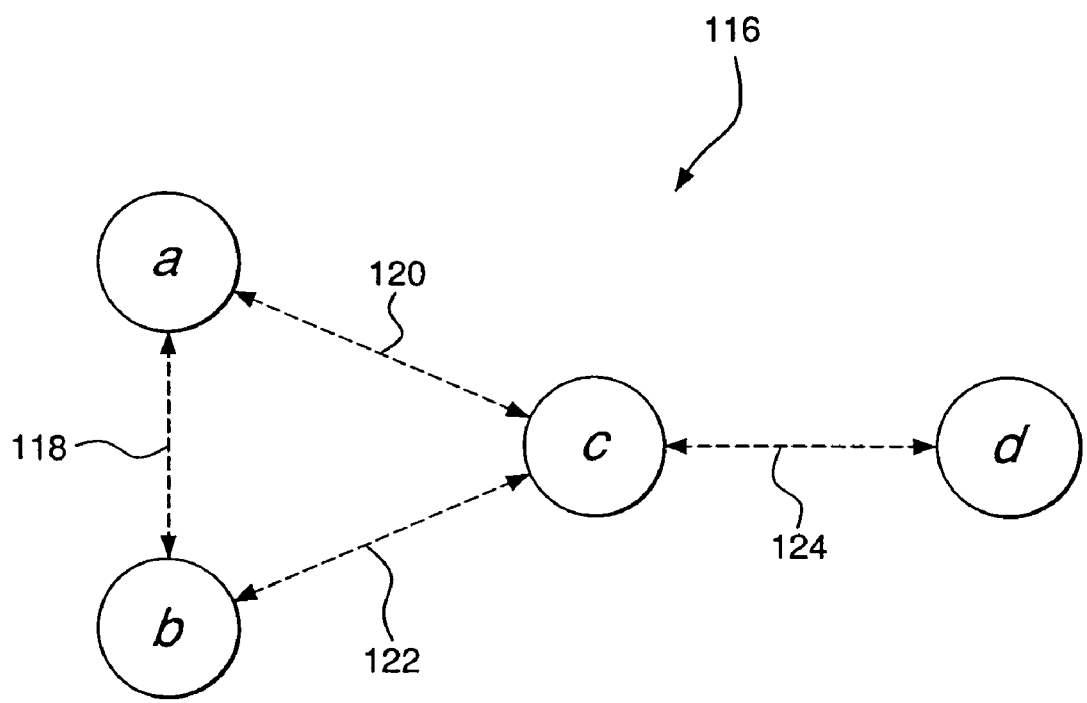
FIG. 3 is a conceptual diagram depicting an example of the relationship between a node and its neighboring nodes in the network shown in FIG. 1 to demonstrate an example of the technique for evaluating the degree of potential hidden node problem that may be experienced by that node according to an embodiment of the present invention.

FIG. 3 is a conceptual diagram illustrating an exemplary relationship 116 between four nodes, consisting of any combination of nodes 102, 106 and 107, in the network 100, which are identified as nodes a, b, c and d. The lines between the nodes a, b, c and d indicate a neighbor relationship. For example, node a is neighbors with nodes b and c, node b is neighbors with nodes a and c, node d is neighbors with node c, and node c is neighbors with nodes a, b and d. The set of neighbors of node a is indicated as set A. The entity a is included in the list of neighbors indicated in set A. So for the portion of the network 100 shown in FIG. 3, the neighbor lists of each node are:

A={a,b,c}

B={a,b,c}

C={a,b,c,d}

D={c,d}

If we consider node c as the node of interest, an example of the technique of identifying the hidden nodes about node c according to an embodiment of the present invention is as follows:

First, the embodiment of the present invention identifies all of the nodes that are neighbors to the node of interest, node c, based on the routing advertisements transmitted by node c, which in this case, includes the node set C. For each neighbor node, a comparison is made between the routing advertisements transmitted by node c and the neighbor lists at each neighbor node. Specifically, as the neighbor list is received from node c at node a, Set A is compared with Set C. As the neighbor list is received from node c at node b, Set B is compared with Set C, and as the neighbor list is received from node c at node d, Set D is compared with Set C. Based upon each comparison, the nodes of each set not shared is then determined. This is the symmetric difference of each set comparison which in this example, is as follows:

C⊕A={d}

C⊕B={d}

C⊕D={a,b}

The union of these sets represents all of the potentially hidden nodes of node c. This set of potentially hidden nodes of node c for the network shown above is known as Pc, and it contains:

Pc={a,b,d}

The number of elements in the set is the determined, which in this example is determined as |Pc|=3, which represents the number of potentially hidden nodes of node c for the network.

All elements of the potentially hidden node set Pc which are neighbors of each other, or sub-neighbors, are then determined. In this example, nodes a, b and d are elements of the potentially hidden node set Pc. Of nodes a, b and d, only nodes a and b are sub-neighbors. These nodes are now treated as a single entry a_b in the new set of hidden nodes around node c:

Hc={a_b, d} so |Hc|=2

Therefore, the degree of hidden nodes about node c is 2.

Since nodes a, b and c are all neighbors of each other, normal coordination can occur between them and they should not attempt to access the medium simultaneously. Therefore, the hidden node contribution made by nodes a and b is reduced to the hidden node contribution of a single node since they are coordinated. The degree of hidden nodes about c (i.e. 2) represents the number of mobile nodes, or radios, that are unaware of each other and which may cause interference at node c.

In the embodiment of the present invention described above, the degree of hidden nodes of each node 102, 106 and 107 in the network 100 is determined in the manner described above. Each node then advertises it's respective metric along with its other routing information in the manner described above. Routing algorithms performed by, for example, the controller 112 of each of the nodes, can use the metric of each node to select transmission paths comprised of nodes having lower degrees of hidden nodes. This will thus minimize the likelihood that the packet will be corrupted or delayed due to the contribution of a hidden node along the route.

As can be appreciated from the above, the embodiment of the present invention can identify and help avoid routes in wireless ad-hoc routing networks that may be degenerate due to a large degree of hidden nodes along the route, as opposed to previous techniques which focused on direct measures of link quality among routes. The embodiment of the present invention can therefore predict areas of high hidden node interference in networks containing radios that cannot directly evaluate link quality.

In addition, some radio standards in use by mobile node, such as 802.11, may perform much more poorly than other standards in the presence of a high degree of hidden nodes. Specifically, the 802.11 standard, while in ad-hoc power-save mode, can experience the inability or greatly diminished capacity to transmit data in the presence of hidden nodes. In such an event, traditional direct measurements of link quality may not reflect the full degenerate condition in existence along a chosen route. Thus, it may be possible for such an area to appear to have a high capacity when in fact the synergy between the ad-hoc power-save algorithm and the hidden nodes may prevent most traffic from being successfully forwarded through the area. However, since the embodiment of the present invention discussed above can specifically identify the areas having high degrees hidden nodes, a routing algorithm may use such determinations to avoid routes through such areas, even though the areas can appear to have high node capacity.

As can be appreciated by one skilled in the art, the embodiment of the present invention can be employed in other wireless routing networks that can suffer from the classic hidden node problem, as well as to 802.11 devices in peer-to-peer mode and any other wireless device that allows direct peer-to-peer communication.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for route selection in an ad-hoc communications network utilizing medium access protocols (MAC), said network including a plurality of nodes wherein each of the plurality of nodes includes a transceiver for transmitting and receiving signals to and from other nodes in said network, the method comprising:

identifying hidden nodes which adversely affect communication between nodes comprising:

calculating a first neighbor node set for at least one node of said plurality, and calculating a second neighbor node set for at least one neighbor node contained in said first neighbor node set, and calculating a degree of hidden nodes value for said at least one node based on said first and second neighbor node sets and communicating said value as part of a routing advertisement; and selecting a routing path which avoids an area containing a high degree of said hidden nodes.

2. A method as claimed in claim 1, wherein said identifying hidden nodes step further comprises:

calculating said first neighbor node set to include each neighbor node of said at least one node, said each neighbor node comprising a node of said plurality with which said at least one node can directly communicate.

3. A method as claimed in claim 1, wherein said identifying hidden nodes step further comprises:

communicating said first neighbor node set to said at least one neighbor node.

4. A method as claimed in claim 1, wherein said identifying hidden nodes step further comprises:

calculating said second neighbor node set to include each neighbor node of said at least one neighbor node, said each neighbor node comprising a node of said plurality with which said at least one neighbor node can directly communicate.

5. A method as claimed in claim 1, wherein said identifying hidden nodes step further comprises:

communicating said second neighbor node set to said at least one node.

6. A method as claimed in claim 1, wherein said identifying hidden nodes step further comprises:

calculating a third neighbor node set to include each neighbor node that is included in said first neighbor node set which is not also a neighbor node that is included in said second neighbor node set.

7. A method as claimed in claim 6, wherein said identifying hidden nodes step further comprises:

locating each neighbor node that is contained in said third neighbor node set which is a sub-neighbor node, said sub-neighbor node comprising at least one neighbor node that is contained in said third node set which can directly communicate with at least one other neighbor node contained in said third neighbor node set; and combining at least one sub-neighbor node plurality into a single representative neighbor node in said third neighbor node set.

8. A method as claimed in claim 7, wherein said identifying hidden nodes step further comprises:

calculating said degree of hidden nodes value based on said third neighbor node set.

9. A method as claimed in claim 1, wherein said identifying hidden nodes step further comprises:

calculating said degree of hidden nodes value for each node of said plurality; and further wherein said selecting a routing path step further comprises:

calculating at least one transmission route from a source node to a destination node based upon at least one said degree of hidden nodes value.

10. A method as claimed in claim 1, wherein said selecting a routing path step further comprises:

calculating at least one transmission route via a routing algorithm based upon said degree of hidden nodes value.

11. A system for route selection in an ad-hoc communications network utilizing medium access protocols (MAC), said network including a plurality of nodes wherein each of the plurality of nodes includes a transceiver for transmitting and receiving signals to and from other nodes in said network, the system comprising:

a first node, wherein said first node calculates a first neighbor node set for at least one node of said plurality;

wherein said first node further calculates a second neighbor node set for at least one neighbor node contained in said first neighbor node set;

wherein said first node further calculates a degree of hidden nodes value for said at least one node based on said first and second neighbor node sets and communicate said value as part of a routing advertisement; and wherein said first node further selects a routing path which avoids an area containing a high degree of said hidden nodes.

12. A system as claimed in claim 11, wherein:

said first node is calculates said first neighbor node set to include each neighbor node of said at least one node, said each neighbor node comprising a node of said plurality with which said at least one node can directly communicate.

13. A system as claimed in claim 11, wherein:

said first node communicates said first neighbor node set to said at least one neighbor node.

14. A system as claimed in claim 11, wherein:

said first node calculates said second neighbor node set to include each neighbor node of said at least one neighbor node, said each neighbor node comprising a node of said plurality with which said at least one neighbor node can directly communicate.

15. A system as claimed in claim 11, wherein:

said first node communicates said second neighbor node set to said at least one node.

16. A system as claimed in claim 11, wherein:

said first node calculates a third neighbor node set to include each neighbor node that is included in said first neighbor node set which is not also a neighbor node that is included in said second neighbor node set.

17. A system as claimed in claim 16, wherein:

said first node locates each neighbor node that is contained in said third neighbor node set which is a sub-neighbor node, said sub-neighbor node comprising at least one neighbor node that is contained in said third node set which can directly communicate with at least one other neighbor node contained in said third neighbor node set; and said first node combines at least one sub-neighbor node plurality into a single representative neighbor node in said third neighbor node set.

18. A system as claimed in claim 17, wherein:

said first node calculates said degree of hidden nodes value based on said third neighbor node set.

19. A system as claimed in claim 11, wherein:

said first node calculates said degree of hidden nodes value for each node of said plurality; and said first node calculates at least one transmission route from a source node to a destination node based upon at least one said degree of hidden nodes value for selecting said routing path.

20. A system as claimed in claim 11, wherein:

said first node calculates at least one transmission route via a routing algorithm based upon said degree of hidden nodes value for selecting said routing path.

* * * * *